(12) United States Patent
Chung et al.

(10) Patent No.: US 10,450,427 B2
(45) Date of Patent: Oct. 22, 2019

(54) USE OF MASTERBATCHES IN THE PRODUCTION OF THERMOPLASTIC VULCANIZATES

(71) Applicant: ExxonMobil Chemical Patents Inc., Baytown, TX (US)

(72) Inventors: Oscar O. Chung, Houston, TX (US); Christopher A. Stafford, Pace, FL (US); Michael J. Goncy, Baytown, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 23 days.

(21) Appl. No.: 15/686,210

(22) Filed: Aug. 25, 2017

(65) Prior Publication Data

US 2018/0112044 A1 Apr. 26, 2018

Related U.S. Application Data

(60) Provisional application No. 62/413,233, filed on Oct. 26, 2016.

(51) Int. Cl.
| | |
|---|---|
| *C08J 3/24* | (2006.01) |
| *C08J 3/22* | (2006.01) |
| *C08K 9/10* | (2006.01) |
| *C08K 3/22* | (2006.01) |
| *C08J 3/00* | (2006.01) |
| *C08K 3/16* | (2006.01) |
| *C08K 3/20* | (2006.01) |

(52) U.S. Cl.
CPC .............. *C08J 3/226* (2013.01); *C08J 3/005* (2013.01); *C08J 3/24* (2013.01); *C08K 3/16* (2013.01); *C08K 3/20* (2013.01); *C08K 3/22* (2013.01); *C08K 9/10* (2013.01); *C08J 2323/12* (2013.01); *C08J 2323/16* (2013.01); *C08J 2423/16* (2013.01); *C08K 2003/2296* (2013.01)

(58) Field of Classification Search
CPC ... C08J 3/226; C08J 3/005; C08J 3/24; C08K 3/16; C08K 3/22; C08K 9/10; C08K 3/20
USPC ........................................................ 523/205
See application file for complete search history.

(56) References Cited

U.S. PATENT DOCUMENTS

| | | | |
|---|---|---|---|
| 8,865,838 B2 | 10/2014 | Roche et al. | |
| 10,294,338 B2* | 5/2019 | Chung | B29C 48/297 |
| 2013/0041090 A1 | 2/2013 | Ono et al. | |
| 2018/0030219 A1* | 2/2018 | Chung | C08K 3/04 |
| 2018/0100061 A1* | 4/2018 | Yamaguchi | C08L 23/10 |
| 2018/0237597 A1* | 8/2018 | Chung | C08J 3/226 |
| 2018/0244069 A1* | 8/2018 | Takenaga | B41J 2/185 |

FOREIGN PATENT DOCUMENTS

| | | |
|---|---|---|
| GB | 2 455 981 A | 7/2009 |
| WO | 2015/008053 A | 1/2015 |
| WO | 2016/085457 A | 6/2016 |

* cited by examiner

*Primary Examiner* — Hannah J Pak

(57) ABSTRACT

A masterbatch for use in the production of thermoplastic vulcanizates comprises stannous chloride powder and zinc oxide powder encapsulated together in a polymer, such as an ethylene propylene diene terpolymer.

8 Claims, No Drawings

USE OF MASTERBATCHES IN THE PRODUCTION OF THERMOPLASTIC VULCANIZATES

PRIORITY CLAIM

This application claims priority to U.S. Provisional Application No. 62/413,233 filed Oct. 26, 2016, the disclosure of which is fully incorporated herein by reference.

FIELD

This invention relates to use of masterbatches in the production of thermoplastic vulcanizates.

BACKGROUND

Thermoplastic vulcanizates (TPVs) are a diverse family of rubber-like materials that exhibit properties of both thermoset rubbers and thermoplastic materials. TPVs show superior aging performance and chemical resistance like thermosets but are easily processed and recyclable within the manufacturing process like thermoplastics. TPVs generally comprise dynamically vulcanized rubber, such as ethylene propylene diene terpolymer (EPDM) rubber, in a thermoplastic matrix comprising a thermoplastic polyolefin such as polypropylene (PP). The TPV looks, feels and behaves like rubber but, due to the thermoplastic content, offers simple, flexible part design and manufacturing.

TPVs are produced by compounding the rubber and thermoplastic components in a reactive extruder such that the rubber component is at least partially crosslinked or vulcanized while being dispersed in the thermoplastic phase. To enable crosslinking of the diene-containing rubber component, a curing agent, such as a phenolic resin, is normally added to the extruder, together with stannous chloride, as a curing accelerator, and zinc oxide, as a curing moderator. Both stannous chloride powder and zinc oxide powder are very difficult to handle regarding materials conveying and feed metering. Additionally, stannous chloride is known to cause severe skin burns, severe eye damage, and as a respiratory irritant. In addition, although in powder form, the stannous chloride and zinc oxide must be metered into the reactor in small, but accurately controlled, quantities, which impose serious challenges for the commercial material conveying, and feed equipment employed.

It is known from, for example, British Patent No. 2455981B that tin (II) chloride may be encapsulated by extrusion in a thermoplastic polymer, such as polypropylene, polyethylene or poly (meth)acrylic acid. The resultant encapsulate is reported to provide a safe and readily transported and easily stored form of tin (II) chloride, which can be used for a variety of industrial uses, including the crosslinking of a polymer mixture comprising natural rubber.

Similarly, International Patent Publication No. WO2015/008053A1 discloses stannous chloride entrained in a thermoplastic polymer wherein the stannous chloride is a particulate form of stannous chloride comprising a stannous chloride particle core coated with a layer comprising stannous oxide. The composition is said to provide low acidity in contact with water and more even distribution of the stannous chloride in the resultant product. The composition is reported as being useful in the preparation of natural and synthetic rubbers, particularly when used in a coextrusion process.

In addition, US Publication No. 2013/0041090A1 discloses a method for producing a thermoplastic elastomer composition, the method involving subjecting an ethylene-α-olefin-based copolymer rubber (A) and a polyolefin-based resin (B) in the presence of an alkylphenol resin (C) and a metal halide (D) to dynamic thermal treatment within a melt-kneading apparatus, wherein the metal halide (D) is a powder, and a mixture of a powder of the metal halide (D) and a particle having a volume-average particle diameter of 0.1 μm to 3 mm is continuously fed to the melt-kneading apparatus. The particle having a volume-average particle diameter of 0.1 μm to 3 mm is preferably a polyolefin-based resin particle and the component (D) is preferably stannous chloride. Mixing apparatuses, which are of non-melt type, such as a tumbler mixer and a Henschel mixer, are preferred for combining the component (D) with the polyolefin-based resin particle.

Despite these proposals, to date there appears to have been no disclosure or suggestion of a combined masterbatch of stannous chloride powder and zinc oxide powder for use in the production TPVs. Although the reason for this omission is not clear, mixing of stannous chloride and zinc oxide in a molten polymer above the melt temperature of the polymer has the potential for the generation of many adverse chemical reactions. For example, the following reaction to produce stannous oxide is possible:

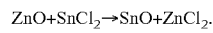

$$ZnO+SnCl_2 \rightarrow SnO+ZnCl_2.$$

Although stannous oxide can exist as a stable bluish black form or a meta-stable red form, it is generally undesirable in a polymer compound because it is known to cause black specks.

According to the present invention, it has now been found that combined masterbatches of stannous chloride powder and zinc oxide powder encapsulated in a carrier polymer, such as EPDM rubber, maintain the white color of the main EPDM rubber and activate phenolic resin curing surprisingly well when used for TPV preparations.

SUMMARY

Thus, in one aspect, the invention resides in a composition comprising stannous chloride powder and zinc oxide powder encapsulated together in a carrier polymer.

In a further aspect, the invention resides in a process for producing a composition comprising stannous chloride powder and zinc oxide powder encapsulated together in a carrier polymer, the process comprising:

(a) supplying stannous chloride powder, zinc oxide powder and a carrier polymer to a mixer;

(b) compounding the stannous chloride powder, zinc oxide powder and the carrier polymer in the mixer at a temperature above the melting point of the carrier polymer to form a molten mixture;

(c) extruding the molten mixture through a die; and (d) cooling the extruded mixture to form the desired composition.

In yet a further aspect, the invention resides in a process for producing a thermoplastic vulcanizate, the process comprising:

(a) supplying to a mixer at least the following components: (i) a thermoplastic resin (preferably comprising polypropylene), (ii) a rubber (e.g., an ethylene-based elastomer such as an ethylene propylene diene terpolymer), (iii) a curing agent, (iv) stannous chloride powder, and (v) zinc oxide powder; and (b) mixing the components under conditions such that the thermoplastic resin melts and the rubber is at least partially crosslinked to produce a heterogeneous product comprising particles of the at least partially crosslinked terpolymer dispersed in a matrix comprising polypropylene, wherein at least part of the stannous chloride powder (iv) and the zinc oxide powder (v) are supplied to the mixer encapsulated together in a carrier polymer.

DETAILED DESCRIPTION

Described herein are a combined masterbatch of stannous chloride powder and zinc oxide powder encapsulated together in a carrier polymer, a process of producing such a masterbatch and use of the resultant masterbatch in the production of thermoplastic vulcanizates. The encapsulated composition has the primary advantage of more accurate metering versus the individual powder components being fed to the final thermoplastic vulcanizate composition. Additionally, the dynamic vulcanization process benefits from a low to non-dusting feedstock, that improves the accuracy of dosing by minimization of dust flyaway loss, and possible reduction of housekeeping and dust collection costs. Health risk may be also be reduced with encapsulation of the stannous chloride, thus minimizing the potential for skin burns, eye damage, and respiratory irritation.

As used herein, the term "masterbatch" means a concentrated mixture of additives, in this case at least stannous chloride powder and zinc oxide powder, encapsulated during a heating process into a carrier polymer, which may then be cooled and cut up into, e.g., granules or pellets.

In the present disclosure, the term "thermoplastic" polymer refers to a polymer that becomes reversibly plastic on heating. In addition the term "polymer" is used herein broadly to include homopolymers and copolymers of two, three or more different monomers, such as a terpolymer of ethylene, propylene and one or more dienes. "Copolymer" includes polymers of two or more different monomers, and "terpolymer" specifically refers to copolymers of three different monomers.

As used herein, a "thermoplastic vulcanizate" or "TPV" is broadly defined as any material that includes a dispersed, at least partially vulcanized, or fully vulcanized, rubber within a thermoplastic resin. A TPV composition can further include oil, additives, and combinations thereof. Suitable rubber components include any elastomeric polymer, and in particular ethylene-based copolymer rubbers such as ethylene-alpha-olefin rubbers, such as ethylene-alpha-olefin and polyene rubbers (in particular, ethylene-propylene-diene or EPDM terpolymer rubbers). Any thermoplastic resin may be used for the thermoplastic resin component, including in particular one or more polypropylenes (both homopolypropylene and propylene-based copolymers). Suitable rubber components include those described in Paragraphs [0025]-[0036] of International Patent Publication No. WO2015/008053A1, which description is incorporated herein by reference. Likewise International Patent Publication No. WO2015/008053A1 describes suitable thermoplastic resin components (paragraphs [0037]-[0044]), process oils (Paragraphs [0057]-[0062]), curatives (paragraphs [0045]-[0051]) and other additives (Paragraphs [0063]-[0066]) suitable for TPV compositions. Suitable methods for making TPVs are described in Paragraphs [0064]-[0089] of International Patent Publication No. WO2015/008053A1. Each aforementioned description is incorporated herein by reference.

As used herein, the term "vulcanizate" means a composition that includes some component (e.g., rubber) that has been vulcanized. The term "vulcanized" is defined herein in its broadest sense, and refers in general to the state of a composition after all or a portion of the composition (e.g., crosslinkable rubber) has been subjected to some degree or amount of vulcanization. Accordingly, the term encompasses both partial and total vulcanization. A preferred type of vulcanization is "dynamic vulcanization" which also produces a "vulcanizate." In at least that context, the term vulcanization encompasses any form of curing (crosslinking), both thermal and chemical, which can be utilized in dynamic vulcanization. In particular, the present invention is concerned with TPVs where curing is conducted in the presence of a curing agent, such as a phenolic resin, together with stannous chloride, as a curing accelerator, and zinc oxide, as a curing moderator.

As used herein, the term "dynamic vulcanization" means vulcanization or curing of a curable rubber blended with a thermoplastic resin under conditions of shear at temperatures sufficient to plasticize the mixture. In preferred embodiments, the rubber is simultaneously crosslinked and dispersed within the thermoplastic resin. Depending on the degree of cure, the rubber to thermoplastic resin ratio, compatibility of the rubber and thermoplastic resin, the kneader type and the intensity of mixing (shear rate), other morphologies, such as co-continuous rubber phases in the plastic matrix, are possible.

Melting point values are determined by Differential Scanning calorimetry (DSC) in accordance with the following procedure. From about 6 mg to about 10 mg of a sheet of the polymer pressed at approximately 200° C. is removed with a punch die. This is annealed at room temperature (about 23° C.) for at least 2 weeks. At the end of this period, the sample is placed in a Differential Scanning calorimeter (TA Instruments Model 2920 DSC) and cooled at a rate of 10° C./min to about −50° C. The sample is heated at a rate of 10° C./min to attain a final temperature of about 200° C. The thermal output during this heating is recorded.

In preparing the present masterbatch, both di-hydrated and anhydrous $SnCl_2$ powder can be used but anhydrous $SnCl_2$ powder is preferred because the melting point of the anhydrous chloride is higher, 246-247° C. Any commercially available source of zinc oxide powder can be used. The surface area of ZnO should be at least 8 $m^2/g$, preferably 8-10 $m^2/g$. In addition to the zinc oxide and stannous chloride, the present masterbatch can contain other additives compatible with the zinc oxide and stannous chloride. Examples of such additives include processing aids, such as oils, which may be advantageous particularly at higher loadings of the zinc oxide and stannous chloride.

Any carrier polymer capable of stably encapsulating zinc oxide and stannous chloride can be used to produce the present masterbatch. In some embodiments, it is desirable that the carrier polymer has a melting point lower than 140° C. Examples of suitable carrier polymers include polypropylene, polyethylene, random copolymer polypropylene (RCP), propylene based elastomers (PBE), ethylene alpha-olefin copolymers (especially where the alpha-olefin comonomer of the ethylene has 12 carbon atoms or less, i.e., is a $C_3$ to $C_{12}$ alpha-olefin), ethylene propylene copolymers, and ethylene-alpha-olefin and polyene terpolymers (especially those having a $C_3$ to $C_{12}$ alpha-olefin), such as ethylene propylene diene terpolymers (EPDM). A carrier polymer according to some embodiments may comprise or consist of any one or any combination of the foregoing.

The preferred carrier polymer is free flowing semi-crystalline EPDM pellets (or other ethylene-alpha-olefin and polyene terpolymer pellets), since the latter are easy to handle and to feed for both continuous mixing and batch mixing, and the mixing can be done at much lower temperature due to the significantly lower softening temperature of EPDM as compared with other semi-crystalline thermoplastics. Moreover, the EPDM carrier polymer can participate in curing reaction along with the main EPDM (or other rubber component) during the TPV processing.

In some embodiments, then, the carrier polymer may advantageously comprise or may consist of the same rubber(s) used as the rubber component(s) in the TPV. For instance, the carrier polymer of such embodiments may comprise or consist of an ethylene propylene polyene terpolymer (such as EPDM) having an unsaturated double bond in the polymer. Generally, the masterbatch will contain at least 20 wt %, such as from 20 to 80 wt %, for example, from 40 to 60 wt % of the carrier polymer based on the total weight of the masterbatch. The unsaturated double bond may allow the carrier polymer to participate in the curing during formation of the TPV, as noted.

The amounts of zinc oxide and stannous chloride present in the masterbatch can be varied according to the amount of each additive required in the target dynamic vulcanization process. In some embodiments, the masterbatch may contain from 7 to 40 wt % (such as 20 to 30 wt %) of stannous chloride powder and from 10 to 70 wt % (such as 30 to 40 wt %) of zinc oxide powder, both based on the total weight of the masterbatch, and provided that the total of stannous chloride powder, zinc oxide powder, and carrier polymer does not exceed 100 wt %. Where the masterbatch also contains a processing aid, this may be present in an amount up to 10 wt %, such as up to 5 wt %, of total weight of the masterbatch (again, such that total of carrier polymer, stannous chloride powder, zinc oxide powder, and processing aid do not exceed 100 wt %).

Typically, the masterbatch is employed as free flowing granules or pellets having a particle size from 100 μm to 5 mm.

The masterbatch is conveniently produced by supplying the desired quantities of the stannous chloride powder, zinc oxide powder, carrier polymer and any processing aid to a mixer, such as a batch mixer (e.g., Banbury mixer) or, more preferably, a continuous mixer (e.g., twin screw extruder). The ingredients are then compounded in the mixer at a temperature above the melting point of the carrier polymer, but generally below 210° C., such as from 100 to 210° C., to form a molten homogeneous mixture. The molten mixture can then be extruded through a die, cooled and cut into pellets or granules. Cutting the extrudate may be effected under the surface of a water bath in some embodiments.

In producing TPVs from the masterbatches described herein, one or more of the masterbatches is compounded with at least one thermoplastic resin, such as polypropylene, at least one curable rubber, such as an ethylene propylene diene terpolymer, and at least one curing agent, such as a phenolic resin, under conditions such that the thermoplastic resin melts and the rubber is at least partially cured (cross-linked) to produce a heterogeneous product comprising particles of the at least partially crosslinked rubber dispersed in a matrix comprising the thermoplastic resin. It is found that the combined zinc oxide/stannous chloride masterbatches are surprisingly effective at activating the phenolic resin curing agent while maintaining the white color of the main EPDM rubber.

Any curative agent that is capable of curing or crosslinking the rubber component in the thermoplastic vulcanizate may be used (e.g., peroxides and silicon-containing curatives), but the just-mentioned phenolic resin curative agents are preferred. Phenolic resin curatives can also be referred to as resole resins, which are made by the condensation of alkyl substituted phenols or unsubstituted phenols with aldehydes, preferably formaldehydes, in an alkaline medium or by condensation of bi-functional phenoldialcohols. Particularly suitable phenolic resins are described in Paragraphs [0105]-[0108] of U.S. Publication No. 2011/0160402, which description is incorporated by reference herein.

The phenolic resin can be introduced into the extrusion reactor in a form of phenolic resin-in-oil ("RIO"), which means the phenolic resin is believed being dispersed and/or dissolved in a mineral oil. The mineral oil can include aromatic mineral oils, naphthenic mineral oils, and paraffinic mineral oils. The method of dispersing and/or dissolving an phenol resin in a mineral oil may be any method known in the art, for example, a method in which the phenolic resin and the mineral oil are fed at once into a glass container equipped with a stirrer and heated under stirring on a water bath of 60 to 100° C. for 1 to 10 hours, as described in U.S. Publication No. 2013/0046049 A1.

In one or more embodiments, the phenolic resin may be employed in an amount from about 2 to about 20, or from about 3 to about 15, or from about 4 to about 10 phr (parts per hundred parts of rubber (e.g., EPDM) included in the thermoplastic vulcanizate).

The invention will now be more particularly described with reference to the following non-limiting Examples.

Example 1

Preparation of Masterbatches

Two different masterbatches (MB1 and MB2) were prepared by compounding Vistalon™ 7001 EPDM rubber (semi-crystalline EPDM which is pellet stable), anhydrous stannous chloride powder, zinc oxide powder (supplied under the trade name ZOCO 102) and ParaMount™ 6001 paraffinic processing oil in a twin screw extruder at about 210° C. Two comparative masterbatches (MB-C1 and MB-C2) were also prepared, one utilizing ZnO without SnCl2 and the other utilizing only thermoplastic carrier polymer (polypropylene). The compositions of the masterbatches are shown in Table 1.

TABLE 1

| Type of Ingredient | MB1 | MB2 | MB-C1 | MB-C2 |
|---|---|---|---|---|
| Rubber, wt % | 47.5 | 47.26 | 47.5 | 0 |
| Thermoplastic, wt % | 0 | 0 | 0 | 50 |
| ZnO, wt % | 33.33 | 36.35 | 50 | 50 |
| SnCl$_2$ Anhydrous, wt % | 16.67 | 13.66 | 0 | 0 |
| Processing Aid, wt % | 2.5 | 2.73 | 2.5 | 0 |

Example 2

Preparation of TPVs

TPV compositions were produced by mixing each of the masterbatches described above with the components listed in Table 2, and dynamically vulcanizing the rubber at temperatures above the melt temperature of the polypropylene in an extruder.

TABLE 2

| Material (all values in wt %) | TPV1 (comp) | TPV2 | TPV3 | TPV4 | TPV5 | TPV6 (comp) | TPV 7 (comp) | TPV 8 (comp) |
|---|---|---|---|---|---|---|---|---|
| V3666B Rubber (75 phr oil-extended) | 53.32 | 53.59 | 53.34 | 53.10 | 53.18 | 53.56 | 53.56 | 53.81 |
| Clay | 12.80 | 12.86 | 12.80 | 12.74 | 12.76 | 12.85 | 12.85 | 12.91 |
| ZnO | 0.00 | 0.00 | 0.00 | 0.00 | 0.00 | 0.00 | 0.46 | 0.00 |
| $SnCl_2$ masterbatch | 0.51 | 0.00 | 0.00 | 0.00 | 0.00 | 0.51 | 0.51 | 0.51 |
| Homo-PP1 | 10.64 | 10.69 | 10.64 | 10.59 | 10.61 | 10.23 | 10.68 | 10.73 |
| Homo-PP2 | 3.14 | 3.16 | 3.15 | 3.13 | 3.14 | 3.16 | 3.16 | 3.17 |
| Carbon black MB | 0.00 | 0.00 | 0.00 | 0.00 | 0.00 | 0.00 | 0.00 | 0.00 |
| MB-C1 | 0.91 | 0.00 | 0.00 | 0.00 | 0.00 | 0.00 | 0.00 | 0.00 |
| MB1 | 0.00 | 0.92 | 1.37 | 1.82 | 0.00% | 0.00 | 0.00 | 0.00 |
| MB2 | 0.00 | 0.00 | 0.00 | 0.00 | 1.67 | 0.00 | 0.00 | 0.00 |
| MB-C2 | 0.00 | 0.00 | 0.00 | 0.00 | 0.00 | 0.92 | 0.00 | 0.00 |
| Resin-in-oil | 3.20 | 3.21 | 3.20 | 3.18 | 3.19 | 3.21 | 3.21 | 3.23 |
| Paramount Oil | 15.49 | 15.57 | 15.50 | 15.43 | 15.45 | 15.56 | 15.56 | 15.63 |

In Table 2, Vistalon 3666B is an EPDM rubber commercially available from ExxonMobil Chemical Company.

"Clay" is Icecap™ K clay.

"Homo-PP1" is a low melt or fractional melt polypropylene homopolymer. "Homo-PP2" is a high flow polypropylene homopolymer. These two homopolypropylenes together constitute the thermoplastic resin of the TPVs exemplified in Table 2.

The Resin-in-oil was a phenolic resin in oil, utilized as a curing agent.

Example 3

Properties of the various sample TPVs were tested; results are reported below in Table 3.

TABLE 3

Properties of formed TPVs

| TPV | LCR (MPa*s) | ESR (micro-inches) | Hardness (shore A) | Wt. Gain (%) | Compression Set (%) | Ultimate Tensile Str. (MPa) | Ultimate Elongation (%) | M100 (MPa) |
|---|---|---|---|---|---|---|---|---|
| TPV1 | 81.63 | 57.4 | 65 | 87 | 24.29 | 5.48 | 395 | 2.69 |
| TPV2 | 90.21 | 54.6 | 60 | 106 | 23.58 | 4.94 | 489 | 2.3 |
| TPV3 | 84.97 | 56.5 | 60 | 115 | 24.82 | 4.9 | 480 | 2.29 |
| TPV4 | 83.58 | 52.7 | 63 | 97 | 26.3 | 4.77 | 421 | 2.29 |
| TPV5 | 83.62 | 50.3 | 60 | 113 | 27.56 | 5.02 | 471 | 2.33 |
| TPV6 | 78.44 | 48.5 | 63 | 84 | 25.73 | 5.83 | 430 | 2.68 |
| TPV7 | 81.92 | 50.9 | 61 | 108 | 24.14 | 5.22 | 402 | 2.55 |
| TPV8 | 83.13 | 54.3 | 64 | 109 | 25.81 | 5.65 | 354 | 2.93 |

In Table 3, LCR is shear viscosity, measured at 204° C. and 1200 $sec^{-1}$ with a Rosand capillary viscometer. Lower viscosity means easier processability, in general.

ESR is extrusion surface rating. ESR can be analyzed as described by Ellul et al., in "Chemical Surface Treatments Of Natural Rubber And EPDM Thermoplastic Elastomers: Effects On Friction And Adhesion," RUBBER CHEMISTRY AND TECHNOLOGY, Vol. 67, No. 4, pg. 582 (1994), incorporated herein by reference. ESR value is reported as an arithmetic average of surface irregularity (Ra), in micro-inches.

Hardness (shore A) is measured per ASTM D-2240.

Weight gain (%) is measured per ASTM D-471 after 24 hours at 125° C. (such that lower values represent greater extent of crosslinking, or cure, in the TPV).

Compression set (%) is measured per ASTM D-395, Method B, at 22 h @ 70° C.

Ultimate tensile strength and M100 (tensile stress at 100% elongation) are measured per ASTM D-638.

The results shown in Table 3 illustrate that formulations including a combined masterbatch of ZnO and SnCl2 was similarly easily processed as compared to the conventional methods, utilizing ZnO powder, while feeding the ZnO was significantly easier (without the need to feed, e.g., ZnO powder). The inventive TPVs further exhibit comparable extent of cure (e.g., as shown by the wt. gain values), indicating minimal detrimental effects from having the ZnO cure aid encapsulated in the rubber master batch. In addition, the TPVs formed from the process exhibited superior ultimate elongation and desirably lower tensile stress at 100% elongation (M100).

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A composition comprising stannous chloride powder and zinc oxide powder encapsulated together in a carrier polymer, wherein the zinc oxide powder is present in the amount of 10 to 70 wt % based on the total weight of the composition.

2. The composition of claim 1, wherein the stannous chloride powder is present in the amount of 7 to 40 wt % based on the total weight of the composition.

3. The composition of claim 1, further comprising a processing aid, wherein the processing aid is present in an amount of up to 10 w % based on the total weight of the composition.

4. The composition of claim 1, wherein the stannous chloride powder comprises anhydrous stannous chloride powder.

5. The composition of claim 1, wherein the carrier polymer comprises at least one polymer selected from the group consisting of polyethylene, polypropylene, ethylene alpha-olefin copolymers, ethylene propylene diene terpolymers, random copolymer polypropylene, and propylene-based elastomers.

6. The composition of claim 1, wherein the carrier polymer has a melting point lower than 140° C.

7. The composition of claim 1, wherein the carrier polymer comprises an ethylene propylene diene terpolymer having an unsaturated double bond in the polymer.

8. The composition of claim 1, wherein the composition is in free flowing granular or pellet form.

* * * * *